Oct. 7, 1930.   C. A. HEISLER   1,777,406
RUMBLE SEAT TOP
Filed Oct. 25, 1927
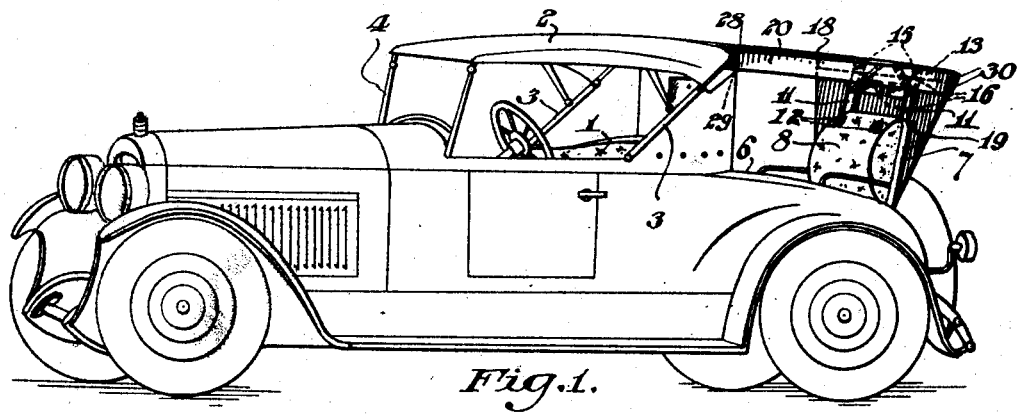
Fig. 1.
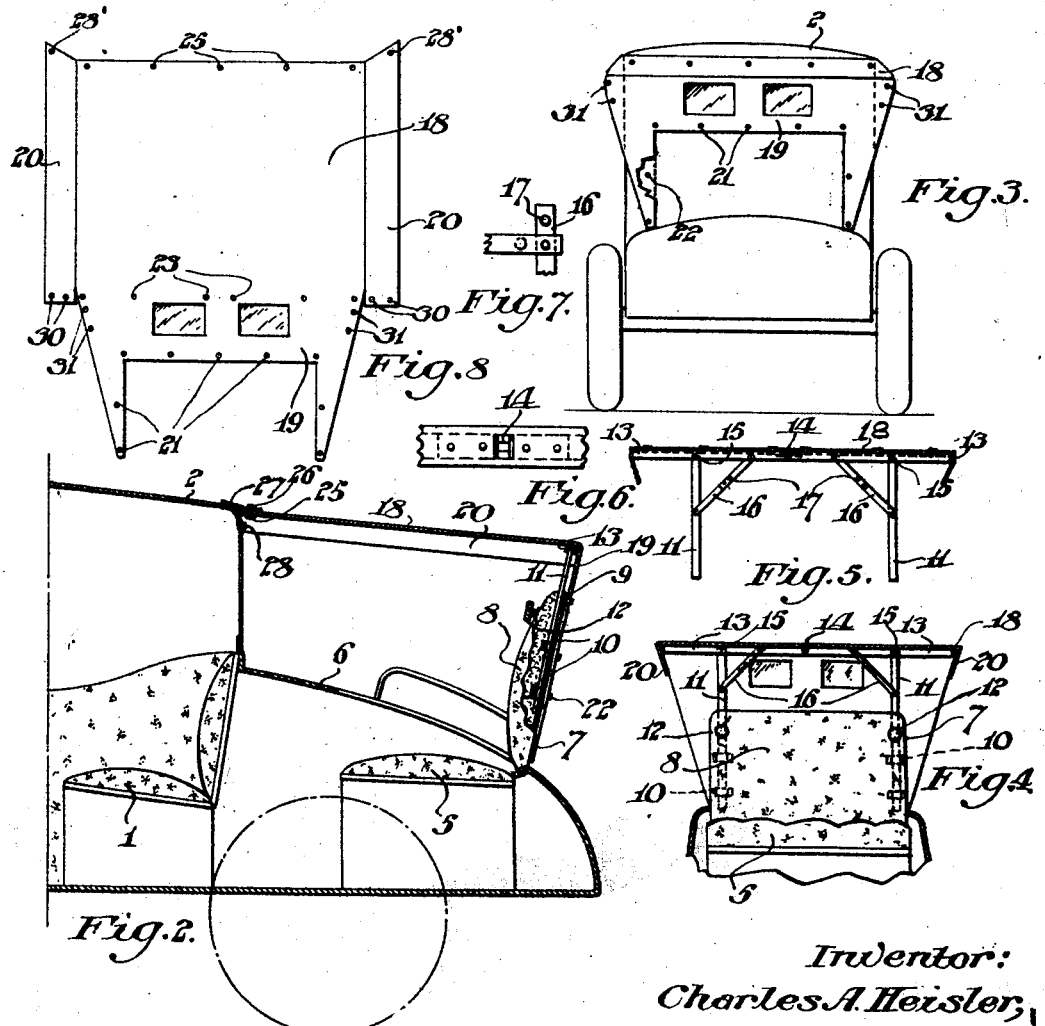
Inventor:
Charles A. Heisler,
By [signature]
Attorney.

Patented Oct. 7, 1930

1,777,406

UNITED STATES PATENT OFFICE

CHARLES A. HEISLER, OF PHILADELPHIA, PENNSYLVANIA

RUMBLE-SEAT TOP

Application filed October 25, 1927. Serial No. 228,518.

My invention is designed to provide means for protecting from storm or sun the occupants of rumble seats of automobiles without seriously impairing the appearance of the vehicle when in use; such means being readily detachable to permit the concealment of the rumble seat within the body of the vehicle when the rumble seat is not required.

Cars of the roadster, coupé or cabriolet type are commonly provided with a main seat having either a fixed or folding top for the protection of the occupants, and with an auxiliary seat at the rear of such top provided with a hinged back forming a portion of the afterdeck of the vehicle body, so that when the back is folded the auxiliary seat is concealed. As such auxiliary or rumble seats are intended only for emergency use and are normally concealed, it is undesirable to have tops of such size as to normally cover said seats or to provide such seats with fixed tops which would interfere with or prevent the concealment thereof.

In accordance with my invention, the folding or hinged back of the rumble seat is provided with sockets for the reception of a frame which may be firmly secured therein by suitable clamps. This frame supports and expands a flexible covering detachably connected with the back by suitable fasteners. The flexible cover is bent over the frame and secured by suitable fasteners to the fixed or collapsible main top of the car. Preferably the covering has flaps depending from the sides thereof; the ends of the flaps being connected with the rear portion of the covering and with the main top.

The frame is composed of upright and cross members pivotally connected together and braced so as to provide ample strength for supporting the covering and at the same time be easily detached and collapsed.

The characteristic features and advantages of my improvements will more fully appear from the following description and the accompanying drawings illustrating the application of my improvements to a roadster.

In the drawings, Fig. 1 is a perspective view of an automobile having my improvements applied thereto; Fig. 2 is a somewhat diagrammatic fragmentary longitudinal sectional view illustrating the application of my improvements; Fig. 3 is a diagrammatic broken rear elevation of an automobile having my improvements applied thereto; Fig. 4 is a front elevation of a rumble seat with my improvements applied thereto; Fig. 5 is a detached view of the frame; Fig. 6 is an enlarged fragmentary plan view showing the joint of the frame cross bar; Fig. 7 is an enlarged fragmentary view of the frame brace joint in the broken position; Fig. 8 is a detached plan view of the covering; and Fig. 9 shows the folded covering rolled up on its frame.

As illustrated in the drawings, an automobile of the roadster type has the body thereof provided with a main seat 1 having a top 2 supported by the usual folding frame work 3 and the windshield posts 4. An auxiliary or rumble seat 5 is located in the body at the rear of the seat 1 and top 2 and beneath the deck 6 which has a section 7 thereof hinged and padded by cushions to form a back 8 for the rumble seat 5.

Sockets 9 are formed in the back 8 adjacent the sides thereof and contain metal straps 10 forming loops or bends for the engagement of uprights 11 adapted to be seated therein and held in place by the thumb screws or clamps 12. A cross bar or support 13, formed of channel iron sections pivotally connected by the pintle 14, is pivotally connected by pintles 15 with the uprights 11, and braces 16, formed of hinged sections, have their ends connected with the support 13 and the respective uprights 11 to retain the frame in expanded form. One section of each brace member 16 may be provided with a stud 17 which snaps into a socket formed in the other member of the brace adjacent to the hinge to add rigidity to the construction.

The frame formed by the uprights and cross piece is adapted to expand and support a covering comprising a body portion 18, depending rear portion 19, and side flaps 20. The back portion 19 is cut out in substantial conformity with the outline of the back 7 and connected therewith by snap fasteners 21 coacting with snap fasteners 22 on the member 7. Rivets 23 connect the covering with the cross piece 13 along the line of juncture between the portions 18 and 19 and snap fasteners 25 on the forward edge of the covering section 18 coact with snap fasteners 26 on a flap 27 hinged to the main top 2. Snap fasteners 28 on the main top 2 are also adapted to cooperate with the snap fasteners 26 on the flap 27 so as to hold this flap down against the rear portion of the top 2 when the auxiliary top is detached. Snap fasteners 28' on the flaps 20 are adapted to coact with snap fasteners 29 on the top 2 and snap fasteners 30 on the flaps 20 coact with snap fasteners 31 on the rear section 19 to hold the flaps in desired relation to the top.

It will be obvious that the covering may be readily detached by disengaging the fasteners and the frame within from its sockets by loosening the clamps 12. The joints of the braces 16 are then broken so as to permit the folding of the uprights 11 into the channel of the cross piece 13, which may be folded on its hinge. The frame members may be rolled in the folded covering to form a compact package such as illustrated in Fig. 9 which may be stowed under the deck 6, or elsewhere, and the back of the rumble seat folded down to the deck to cover the seat.

Having described my invention, I claim:

In an automobile, a rumble deck, a hinged section of said deck disposed between two fixed sections of said deck and forming a back, a cushion on the inner base of said hinged section, sockets housed between said deck and cushion, uprights setting in said sockets, clamps movable through said cushion to secure said uprights, a horizontal member pivotally secured to each of said uprights, said horizontal member comprising pivotally connected sections, braces comprising pivotally connected sections connecting the respective uprights with the respective sections of said horizontal member, a curtain detachably connected with said horizontal member and with the free edge of said hinged deck section, side flaps tapering from said horizontal member toward the hinged edge of said deck section, means for securing the points of said flaps adjacent to the hinged edge of said hinged deck section and means for supporting the forward edge of said curtain.

In testimony whereof I have hereunto set my name this 24th day of October, 1927.

CHARLES A. HEISLER.